United States Patent
Carvalho et al.

(10) Patent No.: US 11,747,360 B2
(45) Date of Patent: Sep. 5, 2023

(54) NEURAL NETWORK SYSTEM WHOSE TRAINING IS BASED ON A COMBINATION OF MODEL AND FLIGHT INFORMATION FOR ESTIMATION OF AIRCRAFT AIR DATA

(71) Applicant: EMBRAER S.A., São José dos Campos (BR)

(72) Inventors: Bruno Javiel Carvalho, São José dos Campos (BR); Gustavo José Zambrano, São José dos Campos (BR); Leandro Fernandes Bergamo, São José dos Campos (BR); Juliano de Melo Lustosa, São José dos Campos (BR)

(73) Assignee: Embraer S.A., São José dos Campos (BR)

( * ) Notice: Subject to any disclaimer, the term of this patent is extended or adjusted under 35 U.S.C. 154(b) by 150 days.

(21) Appl. No.: 16/754,999

(22) PCT Filed: Oct. 11, 2017

(86) PCT No.: PCT/BR2017/000121
§ 371 (c)(1),
(2) Date: Apr. 9, 2020

(87) PCT Pub. No.: WO2019/071327
PCT Pub. Date: Apr. 18, 2019

(65) Prior Publication Data
US 2020/0309810 A1    Oct. 1, 2020

(51) Int. Cl.
*G01P 13/02*   (2006.01)
*G01C 23/00*   (2006.01)
*G01P 5/14*    (2006.01)
*G01P 21/02*   (2006.01)
*G05D 1/10*    (2006.01)

(52) U.S. Cl.
CPC ............ *G01P 13/025* (2013.01); *G01C 23/00* (2013.01); *G01P 5/14* (2013.01); *G01P 21/025* (2013.01); *G05D 1/101* (2013.01)

(58) Field of Classification Search
CPC ........ G01P 13/025; G01P 5/14; G01P 21/025; G01C 23/00; G05D 1/101
See application file for complete search history.

(56) References Cited

U.S. PATENT DOCUMENTS

| | | | | |
|---|---|---|---|---|
| 5,751,609 A | * | 5/1998 | Schaefer, Jr. | G01P 5/00 702/144 |
| 5,901,272 A | * | 5/1999 | Schaefer, Jr. | G01P 5/00 706/17 |
| 2004/0193386 A1 | * | 9/2004 | Flynn | G01G 19/07 702/173 |

(Continued)

OTHER PUBLICATIONS

Curvo, Estimation of aircraft aerodynamic derivatives using Extended Kalman Filter Journal of the Brazilian Society of Mechanical Sciences 2000 (Year: 2000).*

(Continued)

*Primary Examiner* — Regis J Betsch
(74) *Attorney, Agent, or Firm* — Nixon & Vanderhye P.C.

(57) ABSTRACT

Aircraft air data is estimated using a neural network trained to be independent of any signals from air data sensors whose values are based on air flow pressure measurements.

15 Claims, 3 Drawing Sheets

(56) References Cited

U.S. PATENT DOCUMENTS

2007/0150122 A1\* 6/2007 Hongerholt ........... G01P 13/025
                                                        701/3
2010/0100260 A1 4/2010 McIntyre et al.

OTHER PUBLICATIONS

May et al., "Review of Input Variable Selection Methods for Artificial Neural Networks" Book Artificial Neural Networks 2011 (Year: 2011).\*
Ma et al., "Attitude Determination Using a MEMS-Based Flight Information Measurement Unit", Sensors 2012, 12, 1-23 (Year: 2012).\*
International Search Report for PCT/BR2017/000121, dated Feb. 16, 2018, 4 pages.
Written Opinion of the ISA for PCT/BR2017/000121, dated Feb. 16, 2018, 6 pages.

\* cited by examiner

NEURAL NETWORK SYSTEM WHOSE TRAINING IS BASED ON A COMBINATION OF MODEL AND FLIGHT INFORMATION FOR ESTIMATION OF AIRCRAFT AIR DATA

CROSS-REFERENCE TO RELATED APPLICATIONS

This application is the U.S. national phase of International Application No. PCT/BR2017/000121 filed 11 Oct. 2017, which designated the U.S., the entire contents of which is hereby incorporated by reference.

STATEMENT REGARDING FEDERALLY SPONSORED RESEARCH OR DEVELOPMENT

None.

FIELD

The technology herein relates to machine learning and neural networks, and more particularly to methods and apparatus for estimation of aircraft air data by means of a neural network trained to be independent of any signals from traditional air data sensors whose values are based on air flow pressure measurements.

BACKGROUND & SUMMARY

Airspeed, the speed of an aircraft relative to the mass of air around it, is a critical signal in all aircraft operations. It is used both by pilots and on-board systems, influencing their operational decisions or control systems' actions.

In Fly-by-wire aircraft, in particular, demands for availability and integrity of this air speed parameter have been increasing. Considering the highly integrated nature of functions, airspeed is essential to make these aircraft safe or, at least, to provide them adequate handling qualities in flight. Erroneous airspeed values may result in unique failure cases which were not usually present in previous system architectures, resulting in the possibility of unacceptable stability and control characteristics.

For example, as a consequence of an unreliable airspeed event, a flight crew might become confused and fail to diagnose a stall situation. At least one such accident has occurred in aviation history. On Jun. 1, 2009, an Airbus A330-203 operated by Air France (flight AF 447) took off from Rio de Janeiro heading to Paris. A temporary inconsistency was observed between measured air speeds—likely as a result of pitot probes being blocked by ice crystals. This inconsistency caused the autopilot to disengage, and made the airspeed of the aircraft unclear to the flight crew. The crew then failed to diagnose an aerodynamic stall situation caused by underspeed and a nose up attitude. The flight crew consequently presented a lack of inputs that could have made recovery possible.

BRIEF DESCRIPTION OF THE DRAWINGS

The following detailed description of exemplary non-limiting illustrative embodiments is to be read in conjunction with the drawings of which.

DETAILED DESCRIPTION OF NON-LIMITING EXAMPLE EMBODIMENTS

Figure 1:
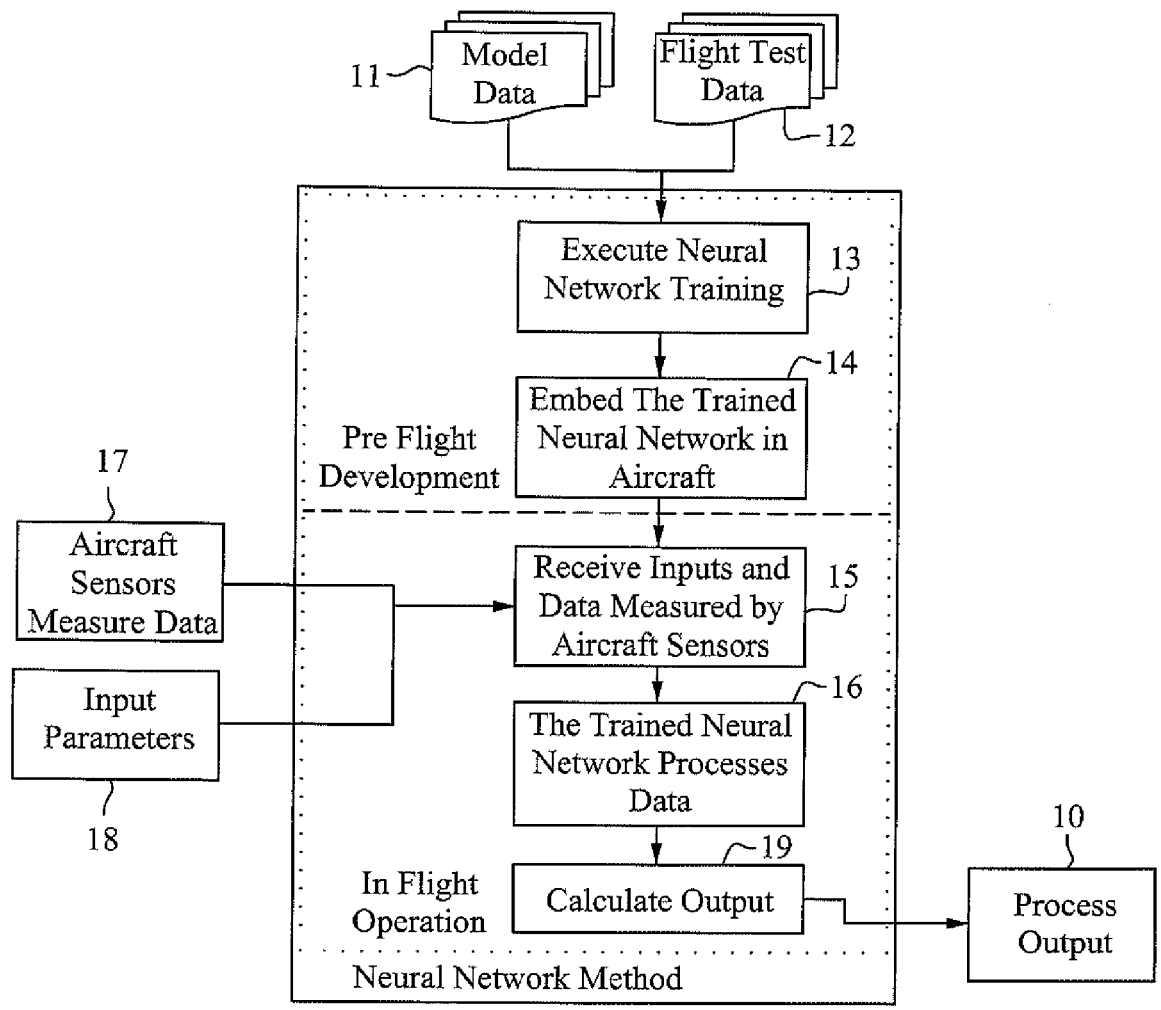
FIG. 1 illustrates an example non-limiting development process of a neural network, dividing it in a Pre-Flight Development Phase, composed by training and embedding the network, and in a second part of In-flight Operation where the estimations are performed in real time.

After Air France accident, certification authorities in different countries expanded their concerns regarding the effects of erroneous air data in aircraft. Some now require that consequences of erroneous data from two sensors of the same type do not result in a catastrophic failure. For more than two sensors of the same type, the consequences of erroneous data shall be minimized as far as practicable. The use of independent sources of information, analytical redundancy or model-based fault detection and isolation techniques are mentioned to be considered. Trying to avoid these types of situations, redundant sensors may be used as well as heating devices to reduce certain environmental effects.

At this point, it is helpful to connect the idea of sensors of the same type, mentioned by the authorities, with the method used by conventional sensors, like pitot tubes, to measure air data. Pitot tubes do not measure air speed directly. Rather, a pitot tube sensor measures total pressure and static pressure. The differential between these two measurements is sensed and used to calculate air data, including aircraft airspeed and dynamic pressure.

Unfortunately, in a plurality of scenarios, the pressure lines of pitot tube sensors might be blocked by unintended objects. These blockers may include, but are not limited to: ice, rain, hail, insects, volcanic ash or sand. Pitot tubes are potentially subject to other threats that might cause erroneous air data calculations. As they are external and protuberant sensors, bird strikes might affect them.

Large jet aircraft have multiple pitot tube sensors but a blocked pitot tube may eliminate the benefit of redundant sensors in terms of making available multiple sensed parameters for comparison and analysis. Moreover, if all of these sensors are of the same type, they could all become simultaneously blocked (common cause event). This would result in inaccurate identification of the air speed indication and other parameters based on pressure measurements. Simultaneous faults might not be detected by fault isolation logic. This is the kind of scenario that authorities are asking to be avoided by adding sensors of different types.

In many other cases, dissimilar sensors (i.e. use of sensors of different types) are also necessary or helpful, in order to mitigate common cause or common mode faults. Maintenance errors or development errors may also be mitigated by using different types of sensors.

For example, an angle of attack vane sensor may be used as a dissimilar sensor. It is an air data sensor to measure aircraft's angle of attack, in which the vane is attached to a shaft that may rotate freely. Once the angle of attack is known, a synthetic airspeed may be calculated from a combination of the angle of attack value with a few others parameters like weight and altitude (this method is used by patent US 2010/0100260 A1).

Another example is the use of laser sensors, also called LIDAR (Light Detection and Ranging) sensors. Some recent research suggests adopting this kind of sensor to measure airspeed. Some such sensors operate based on the Doppler Effect (change in frequency or wavelength of a wave, or other periodic event, for an observer moving relative to its source). Others base their measurements on Rayleigh scattering (in which photons interact with molecules smaller than the wavelength of light).

Nevertheless, sensors that introduce new technologies often require special attention—namely, developing new algorithms for voting or otherwise processing their signals. Of course, new types of sensors can fail in new and unpredictable ways. System logic should be prepared to deal with such failure modes. For example, angle of attack vanes may become jammed for some reason. Also, remember that increasing the number of sensors means adding more weight to the aircraft and associated incremental complexity of the system.

Trying to avoid all these issues, some model-based approaches are being considered. For example, in order to estimate air velocity using only a Global Positioning System and an Inertial Navigation System, an extended Kalman filter may be designed using 6 DOF equations of motion (Yong-gonjong Park and Chan Gook Park presented their paper named "Wind Velocity Estimation Without An Air Speed Sensor Using Kalman Filter Under The Colored Measurement Noise" at 30th Congress of the International Council of the Aeronautical Sciences, 2016). This method, however, depends on having a good and reliable aircraft model implemented in the Kalman Filter. As modern transonic aircraft may have complex and highly non-linear aerodynamic and thrust models, this method may be difficult to implement and adjust or may become too complex to have practical implementations.

A New Approach

The technology herein provides a trustworthy and advantageous method to calculate an independent source of air data that addresses the problems discussed above, i.e., it is designed to be totally independent of traditional air data sensors and it uses other sensors that are already present in modern aircraft systems. Such system would mitigate the common cause modes of failure without adding weight, cost and complexity to aircraft systems.

The example non-limiting technology herein estimates air data using a low cost software-based neural network and associated algorithm.

Definition of "Air Data"

For the purposes of this disclosure, from the term "air data", one may understand any element in the following list of options:

Angle of Attack: angle formed between a reference in the aircraft body and the airspeed vector in a plane perpendicular to the wings;

Angle of sideslip: angle formed between a reference in the aircraft body and the airspeed vector in a plane containing the wings;

Airspeed: the speed of the aircraft relative to the mass of air around it;

Mach number: ratio between the magnitude of the airspeed and the speed of sound.

Dynamic Pressure: kinetic energy per unit volume of the fluid moving around the aircraft.

The disclosed technology herein is not limited to always estimating the whole set of air data mentioned above. It may be implemented either to estimate some of these parameters or only one of them, depending on specific implementations or design objectives. Also, if necessary, more than one neural network may be implemented to estimate these air data signals.

Neural Network Approach

Neural Networks are computing systems inspired by the biological neural networks that constitute animal brains. Such systems learn (i.e., are trained to progressively improve performance) to do tasks or to estimate parameters by considering examples. The neural network consists of a set of gains and bias (neurons) which passes through some non-linear activation function. These neurons are organized in layers which connect the inputs to the desired output.

Training the Neural Network

FIG. 1 illustrates an example non-limiting development process of a neural network, dividing it in a Pre-Flight Development Phase, composed by training and embedding the network, and in a second part of In-flight Operation where the estimations are performed in real time.

The neural networks of example non-limiting embodiments herein are trained (13) on desktop or other computers using data obtained by aircraft model simulations (11) and real flight results (12). The training involves collecting a series of exemplars of inputs-outputs conjugates (model or flight-test data) and using optimization algorithms to adjust the neural network bias and gains which provide the best possible estimation.

As shown in FIG. 1, in example non-limiting embodiments, exemplars used to train the neural network may be obtained from two different sources of data: aircraft representative model (11) or real flight tests data (12).

1. Model of the aircraft (11). An aircraft model is used in many analyses along the development of an aircraft. It can comprise best knowledge obtained from wind tunnels, Computational Fluid Dynamics, previous experience, mathematical modeling or flight test data. Typically, obtaining data using models can be cheaper and faster than using real aircraft flight data.

2. Real Flight Test Data (12). Signals recorded along flights during aircraft development phase (12) may also be used as exemplars for training the neural network.

No matter how the whole set of training data is composed, i.e., from which source they come from or how much data comes from each source, it is important that they substantially cover the aircraft flight envelope.

The process of training the network (13) shown in FIG. 1 consists of using optimization algorithms to adjust the neural network bias and gains to provide the best nonlinear input-output relationship between input variables and the desired output. It is expected that this training step (13) of the process comprises the following iterative sequence: training the neural network, validating the relationship obtained, analyzing the accuracy of the estimation and, if necessary rearranging the topology of the network, restarting this cycle or, once the training is sufficiently complete, freezing the relationship obtained as a final result.

After the neural network is trained by the method shown in FIG. 1, the neural network gains, bias and topology are frozen and, as a consequence, ready to be embedded in the aircraft (14). The frozen relationship is stored in a non-transitory memory device in any onboard computer (27) which is capable of performing the same kind of estimations in air, in real time. Note that the neural network (23) (34) is not supposed to keep training at this stage (14).

There are an uncountable number of possibilities to be used as memory device. Some options include:
1. Dedicated computer.
2. Include the neural network as part of the Flight Controls Software and embed it into Flight Control Computers.
3. Embed into Flight Management Computer
4. Avionics software and embed into any avionics computer.

On-Board Operation of the Trained Neural Network

Figure 2:
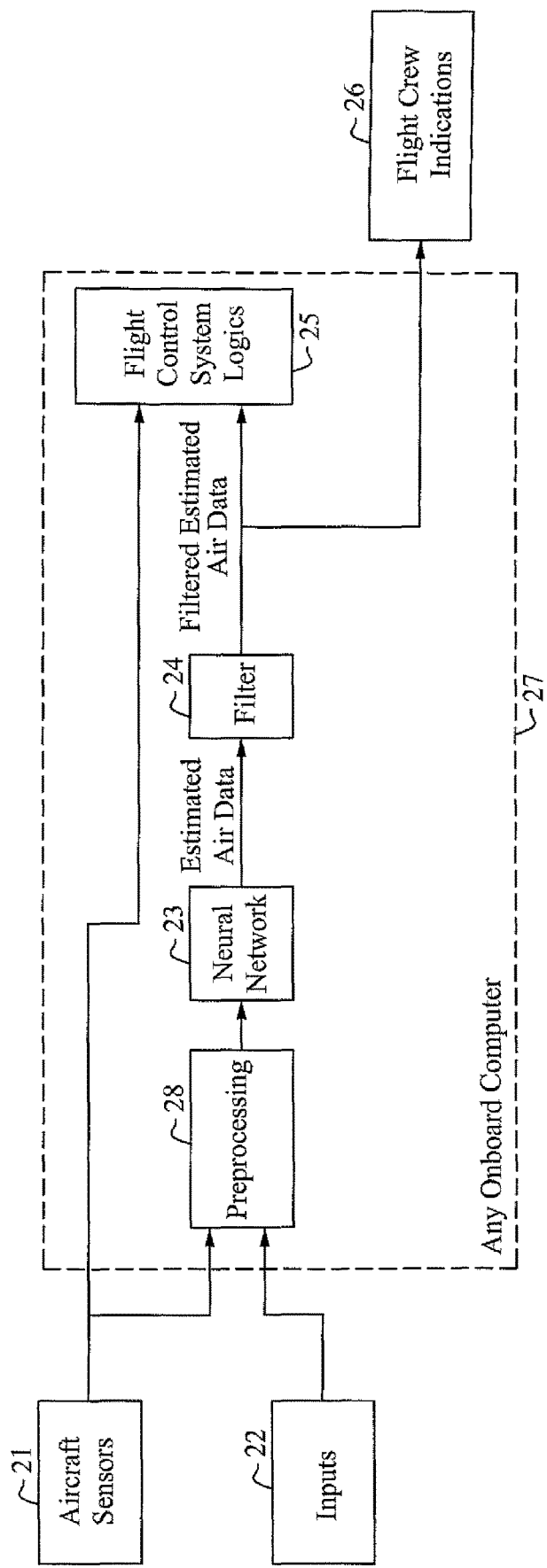
FIG. 2 provides more details about the example non-limiting operation of the neural network onboard a flight computer. If a correlation were made with FIG. 1, FIG. 2 would represent a more detailed view of items (18) (15) (16) (19) and (10). The Preprocessing step (28) and the Filter (24) are examples of such details.

Once the desired performance is achieved, this neural network is frozen and implemented in any onboard computer (27) on board the aircraft to provide real-time air data estimation as shown in FIGS. 1 and 2.

FIG. 1 shows that the embedded neural network receives inputs (18) and data measured by aircraft sensors (17) (block 15), processes the data (block 16) and calculates output (block 19). Additional system(s) can be used to process the calculated output (block 10).

When embedded in the aircraft (14) as shown in the lower part of FIG. 1, the neural network receives the inputs coming from aircraft sensors (15). These inputs represent the same list of signals previously used in training the neural network algorithm (11) (12), but now they are being read in real time by aircraft sensors (17) or informed as inputs parameters by pilots (18). By inputting these signals on the pre-trained neural network (16), the onboard computer calculates the desired outputs in real time.

FIG. 2 shows an overall onboard neural network system and provides more details about the example non-limiting operation of the neural network onboard a flight computer. If a correlation was made with FIG. 1, FIG. 2 would represent a more detailed implementation view of items (18) (15) (16) (19) and (10) of FIG. 1. The Preprocessing step (28) and the Filter (24) are examples of such details.

As FIG. 2 shows, the previously-trained neural network (23) consumes real-time data from aircraft sensors (21) (sometimes after they are preprocessed (28)) and calculates an estimated air data output. The neural network estimated air data output may be filtered (24) using some Low-pass, Kalman or Complementary filter. The neural network's outputs (19), depending on particular implementations, may be filtered (24) (35) to reduce the noisy behavior of the signal. The filter's bandwidth (24) (35) may be adjusted to suit particular implementations, as well as the type of filter used. Tests may indicate that a particular type of filter is recommended in each case. The options covered by example non-limiting embodiments include for example Low-Pass, Kalman and Complementary Filters (24) (35). For example, a neural network estimating airspeed may have the noisy behavior of its signal reasonably removed by merging the neural network airspeed estimation with measured aircraft longitudinal acceleration in a Kalman or Complementary filter. The function of such filtering in some implementations may be to "fuse" the estimated air data with other input data to provide a more accurate, reliable and/or robust output.

The filtered estimated air data may be used by some onboard computer such as the Flight Control Computer (25) or may be used to display a synthetic air data (such as airspeed) to pilots (26). Some logics (10) that may consume the neural network's output (unfiltered or filtered, as previously described) are Flight Control System Logic (25) (for example Control Laws or Common Design Error Monitors) and Flight Crew Indications (26) (like an indication of estimated airspeed to the pilots through avionics displays).

Sensor Inputs to the Neural Network

The methods disclosed herein do not require a list of extra sensors specially installed in the aircraft to feed the estimations. Example non-limiting embodiments use currently available sensors of modern aircraft systems to supply the necessary parameters during the flight to estimate the desired synthetic air data parameters (see FIG. 3). In example non-limiting implementations, the list of inputs is carefully selected to be formed only by sensors of different types than those normally used to measure air data (i.e., only by sensors that do not depend on measurements of total pressure and static pressure which have pressure lines that may be blocked by unintended objects, such as pitot tubes).

Figure 3:
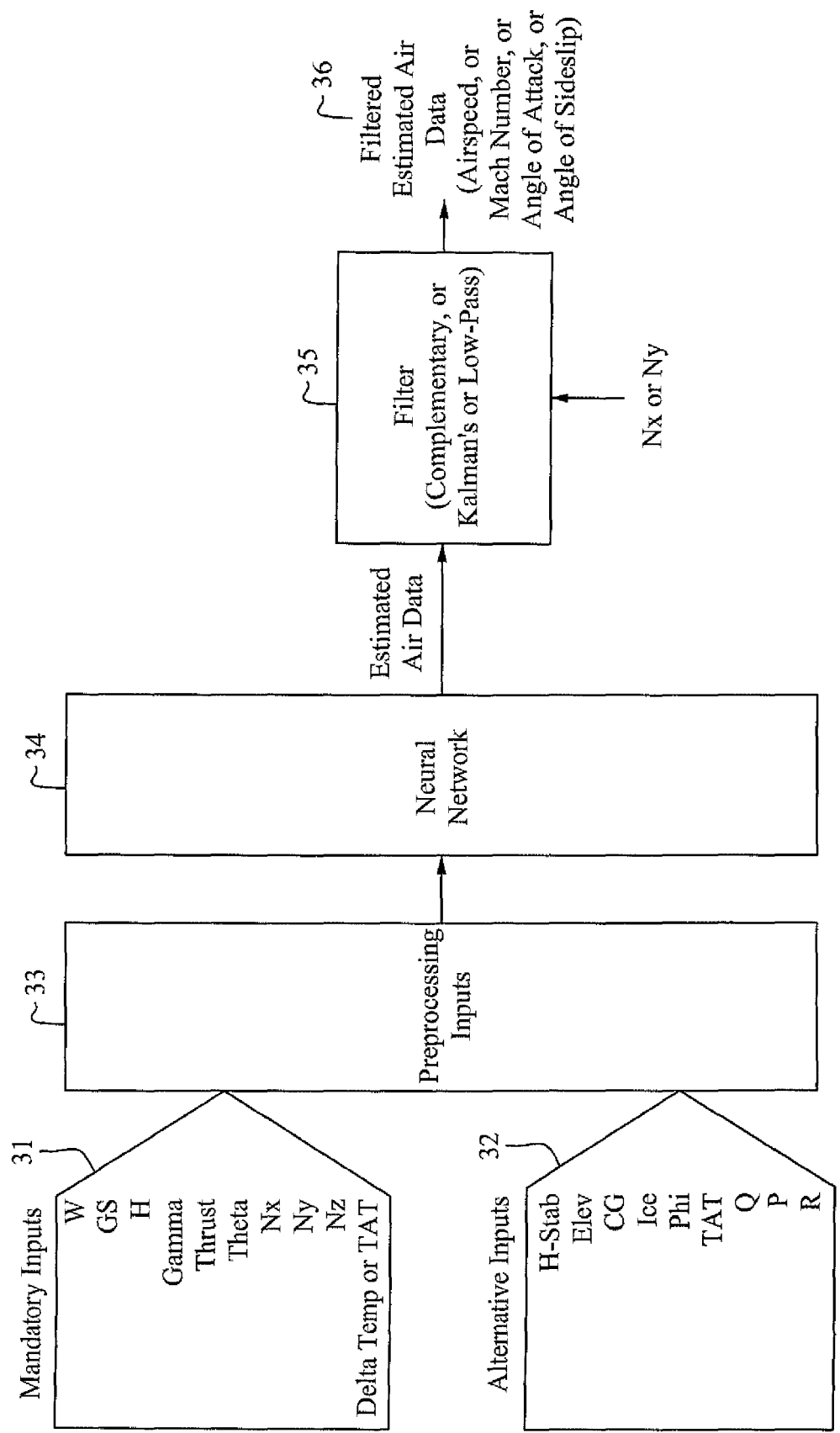
FIG. 3 goes one step further into details about example non-limiting inputs of the neural network, divided into Mandatory (31) and Alternative (32). They represent simultaneously (17) and (18), from FIG. 1, and (21) and (22), from FIG. 2. Other details given by FIG. 3 are related to the examples of filters (35) and the possibilities of air data outputs (36).

FIG. 3 goes one step further into details about example non-limiting inputs of the neural network, divided into Mandatory (31) and Alternative (32). They represent simultaneously (17) and (18), from FIG. 1, and (21) and (22), from FIG. 2. Other details given by FIG. 3 are related to the examples of filters (35) and the possibilities of air data outputs (36).

As FIG. 3 shows, in one example non-limiting implementation, the neural network is based in the following list of "mandatory" inputs (31) (although see explanation below that "mandatory" does not necessarily mean "strictly necessary" in all embodiments and all contexts):

Weight (W): Estimated aircraft weight. Once the weight estimation may be dependent of air data availability in some embodiments, the value received from the Flight Management System (FMS) represents an alternative in some implementations. Another option is to implement some logic to freeze the current estimated weight stored in a memory before some aircraft system detects an air data failure and then use some estimated fuel flow to numerically integrate the current weight over time;

Ground Speed (GS): normally measured by aircraft's Inertial Reference Units (IRU) (e.g., accelerometers and/or gyro sensors) or Global Positioning System (GPS), but might also be supplied by other systems in some particular implementations. Corresponds to the aircraft's speed relative to the ground, considered as an inertial reference;

Geometric Altitude (H): normally measured by aircraft's Global Positioning System (GPS), but might also be supplied by other systems in some particular implementations. Corresponds to the height above sea level;

Angle of Trajectory (Gamma): normally measured by aircraft's Inertial Reference Units (IRU) (see above), but might also be supplied by other systems in some particular implementations. As the inertial speed of the aircraft is a vector tangent to its trajectory, Gamma is the angle formed between this vector and the Earth's plane;

Engine's Magnitude of Thrust (Thrust): a plurality of parameters may be used as indicatives of how much thrust the engines are providing to the aircraft at or during some instant of time. For example, the following may be used: Fan Speed (N1), or Thrust Lever Angle (TLA), or Engine Pressure Ratio (EPR) or others. Normally, they are measured by aircraft's Full Authority Digital Engine Control (FADEC), but might also be supplied by other systems in some particular implementations. The chosen parameter should have some physical relationship with the magnitude of thrust delivered by engines.

Angle of Attitude (Theta): normally measured by aircraft's Inertial Reference Units (IRU), but might also be supplied by other systems in some particular implementations. Corresponds to one of the Euler Angles, measured between the fuselage center axis and the Earth's plane;

Longitudinal Acceleration Load Factor (Nx): normally measured by aircraft's Inertial Reference Units (IRU), but might also be supplied by other systems in some particular implementations. Corresponds to the resultant of external forces acting in an aircraft's longitudinal axis normalized by aircraft actual weight. Instead of Nx, any parameter that has some physical relationship with the magnitude of aircraft longitudinal acceleration may be used.

Vertical Acceleration Load Factor (Nz): normally measured by aircraft's Inertial Reference Units (IRU), but might also be supplied by other systems in some particular implementations. Corresponds to the resultant of external forces acting in aircraft's vertical axis normalized by aircraft actual weight. Instead of Nz, any parameter that has some physical relationship with the magnitude of aircraft vertical acceleration may be used.

Lateral Acceleration Load Factor (Ny): normally measured by aircraft's Inertial Reference Units (IRU), but might also be supplied by other systems in some particular implementations. Corresponds to the resultant of external forces acting in aircraft's lateral axis normalized by aircraft actual weight. Instead of Ny, any parameter that has some physical relationship with the magnitude of aircraft lateral acceleration may be used.

Delta Temperature from Standard Atmosphere (Delta Temperature): corresponds to a calculation of the deviation of outside air temperature from that expected by Standard Atmosphere model, such as ISA (International Standard Atmosphere ICAO model), but not limited to. This calculation uses measured Total Air Temperature (TAT), Mach and Pressure Altitude. As this algorithm depends on parameters which are measured by aircraft Air Data System, special care is necessary to mitigate possible common causes that leads to loss of air data system. Then, using some logic analogous to the signal of Weight, it may be necessary to preprocess this signal. A possibility could be holding the last trustworthy value calculated just before the loss of air data. Another option is, if Total Air Temperature (TAT) sensors do not have a common mode failure with air data sensors (such as presence of ice crystals or design error), Delta Temperature may be replaced by Total Air Temperature (TAT) as an input of estimation logics.

A second list of inputs to the neural network is presented below. This list (32) contains signals that may improve the accuracy of the estimation in some particular implementations and/or signals that may represent alternatives in cases where previously signals mentioned as mandatories are not available. Thus, the term "mandatory" as used above does not mean the example embodiments cannot function or be designed without the particular signal.

Horizontal Stabilizer Position (H-Stab): normally supplied by Horizontal Stabilizer Control Unit (HSCU), but might also be supplied by other systems in some particular implementations. Corresponds to a measurement of the deflection of the aircraft's Horizontal Stabilizer relative to a predetermined reference in the aircraft.

Elevator Position (Elev): normally supplied by sensors belonging to Primary Flight Control Systems, but might also be supplied by other systems in some particular implementations. Corresponds to a measurement of the deflection of aircraft's Elevator relative to a predetermined reference in the aircraft.

Center of Gravity (CG): Estimated aircraft center of gravity. Once the CG estimation may be dependent on air data availability in some embodiments, the value received from the Flight Management System (FMS) represents an alternative in some implementations. Another option is to hold the last trustworthy calculated value of CG and then, from this point, integrate the fuel consumption to estimate the CG travel when some aircraft system detects an air data failure;

Ice Detected Flag (Ice): normally supplied by Air Management System (AMS), but might also be supplied by other systems in some particular implementations. Corresponds to a Boolean flag, indicating the presence of Ice;

Bank Angle (Phi): normally measured by the aircraft's Inertial Reference Units (IRU), but might also be supplied by other systems in some particular implementations. Corresponds to one of the Euler Angles, measured between the wings axis and the Earth's plane;

Total Air Temperature (TAT): normally measured by aircraft's Air Data System, which means that special care is necessary to mitigate loss of TAT, but might also be supplied by other systems in some particular implementations. Corresponds to Air Temperature measured in an airflow stagnation point (may be inside a pitot tube);

Pitch Rate (Q): normally measured by the aircraft's Inertial Reference Units (IRU), but might also be supplied by other systems in some particular implementations. Corresponds to the angular rate of variation of the aircraft around the axis formed by the wings;

Roll Rate (P): normally measured by the aircraft's Inertial Reference Units (IRU), but might also be supplied by other systems in some particular implementations. Corresponds to the angular rate of variation of the aircraft around the axis formed by the fuselage;

Yaw Rate (R): normally measured by the aircraft's Inertial Reference Units (IRU), but might also be supplied by other systems in some particular implementations. Corresponds to the angular rate of variation of the aircraft around the axis perpendicular both to the wings and to the fuselage axes;

The list of inputs described herein composes the subsets selected for training the neural network (11) (12). These subsets may vary as a function of the desired neural network output (36) and also based on how many neural networks (23) (34) are going to be used on estimations.

Example Non-Limiting Sensor Signal Preprocessing

There are some cases where the signals used for estimations are preprocessed (28) (33) before being applied to the neural network (23) (34). For example, estimated weight and estimated center of gravity may be functions of air data in some applications. Then, considering the fact that the neural network may need to function in scenarios of total loss of air data, and also considering that weight is one of its mandatory inputs (31), options are desirable. One possible solution is using the weight or center of gravity informed by the Flight Management System (FMS). If these values already contain information about the fuel consumption, i.e., if weight value decreases with time in a magnitude that represents fuel consumption and if center of gravity moves accordingly, they may be good alternatives. However, in cases where the fuel consumption is not properly informed through these signals, another possibility is to hold the last trustworthy calculated values and then, from this point, integrate the fuel consumption, or alternatively using the volume of fuel in the fuel tank. In both cases, as values from the Flight Management System (EMS) might assume important holes on the estimations' results (especially the weight), some kind of validation of these signals may be necessary because they usually depend on manual inputs given by the pilots when the aircraft is on ground. Validations would prevent wrong neural network's estimations due to human errors.

Another kind of preprocessing (28) (33) associated with weight and center of gravity estimations is related to some interlocks that might freeze the estimations if the aircraft has assumed abnormal attitudes. They could be formed by thresholds defining a flight envelope outside of which the estimations would return big errors. For example, interlocks may be used with Ny, Nz, Phi, Theta, Alpha or even by a flag indicating the presence of ice.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

The invention claimed is:

1. A method generating estirnated air speed data and/or dynamic pressure comprising kinetic energy per unit volume of fluid moving around the aircraft, comprising:
   on board an aircraft, using only plural sensors that do not depend on any measurement of total pressure or static pressure to sense a set of sensed parameters other than air data based on air flow pressure measurements, the set of sensed parameters consisting essentially of:
   (a) Estimated aircraft weight,
   (b) Ground Speed (GS),
   (c) Geometric Altitude,
   (d) Angle of Trajectory (Gamma),
   (e) Angle of Attitude (Theta),
   (f) Longitudinal Acceleration Load Factor (Nx),
   (g) Lateral Acceleration Load Factor (Ny),
   (h) Vertical Acceleration Load Factor (Nz),
   (i) Delta Temperature from Standard Atmosphere or Total Air Temperature, and
   (j) Engine's Magnitude of Thrust; and
   with at least one processor connected to the plural sensors, operating a trained neural network on board the aircraft to estimate air speed data and/or dynamic pressure comprising kinetic energy per unit volume of fluid moving around the aircraft based on said set of sensed parameters other than air data based on air flow pressure measurements and without requiring measurements by pilot tubes or other sensors that measure total pressure or static pressure based on pressure lines that may be blocked by unintended objects.

2. The method of claim 1 further including training the neural network on said set of sensed parameters.

3. The method of claim 1 further including filtering the air speed data estimated by the neural network by a Low-pass, Kalman or Complementary filter.

4. The method of claim 1 further including preprocessing the set of sensed parameters before applying them as inputs to the neural network.

5. The method of claim 1 wherein the set of sensed parameters further includes some or all of Horizontal Stabilizer Position, Elevator Position, Center of Gravity, Ice Detected Flag, and Bank Angle.

6. The method of claim 1 further including merging a neural network air speed estimation with at least one inertial measurement using a Kalman or Complementary filter.

7. The method of claim 1 wherein air speed data comprises at least one of:
   angle of attack formed between a reference in an aircraft body and an airspeed vector in a plane perpendicular to the wings;
   angle of sideslip comprising an angle formed between a reference in the aircraft body and the airspeed vector in a plane containing the wings;
   air speed meaning the speed of the aircraft relative to the mass of air around it;
   mach number comprising a ratio between the magnitude of the air speed and the speed of sound.

8. A method of generating estimated air speed data and/or dynamic pressure comprising kinetic energy per unit volume of fluid moving around the aircraft, comprising:
   on board an aircraft, using plural sensors to sense a set of sensed parameters comprising at least:
   (a) Ground Speed (GS),
   (b) Angle of Trajectory (Gamma),
   (c) Angle of Attitude (Theta),
   (d) Longitudinal Acceleration Load Factor (Nx),
   (e) Lateral Acceleration Load Factor (Ny),
   (f) Vertical Acceleration Load Factor (Nz), and
   (g) a parameter related to air temperature; and
   with at least one processor connected to the plural sensors, operating a trained neural network on board the aircraft to estimate air speed data and/or dynamic pressure comprising kinetic energy per unit volume of fluid moving around the aircraft based on said set of sensed parameters without requiring measurements by pitot tubes or other sensors that measure total pressure or static pressure based on pressure lines that may be blocked by unintended objects,
   further including with the at least one processor, detecting absence of air pressure data sensed by a pitot tube or another sensor that depends on measuring total pressure or static pressure based on a pressure line that may be blocked by unintended objects, and in response to the detected absence, using an air speed data value dependent on air pressure data previously sensed by a pitot tube or another sensor that depends on measuring total pressure or static pressure based on a pressure line that may be blocked by unintended objects and that was captured before the detected absence and holding the said captured air speed data value or updating the captured air speed data value with said set of sensed parameters, and inputtimg updated value to the neural network so that when there is a failure of a pitot tube or another sensor that depends on measuring total pressure or static pressure based on a pressure line that may be blocked by unintended objects, then air speed data the neural network estimates based on the set of sensed parameters can be used to operate the aircraft.

9. A system for generating estimated air speed data and/or dynamic pressure comprising kinetic energy per unit volume of fluid moving around the aircraft, compri sing:
   sensors on board an aircraft that do not depend on measurements of total pressure and static pressure based on pressure lines that may be blocked by unintended objects, the sensors producing sensed parameters comprising (a) Ground Speed (GS), (b) Angle of Trajectory (Gamma), (c) Angle of Attitude (Theta), (d) Longitudinal Acceleration Load Factor (Nx), (e) Lateral Acceleration Load Factor (Ny), (f) Vertical Acceleration Load Factor (Nz), and (g) Delta Temperature from Standard Atmosphere or Total Air Temperature (TAT), and a processor connected to the sensors, the processor operating a trained neural network to estimate air speed data and/or dynamic pressure comprising kinetic energy per unit volume of fluid moving around the aircraft in response to said sensed parameters without requiring measurements of sensors such as pitot tubes that measure total pressure or static pressure based on pressure lines that may be blocked by unintended objects, wherein the processor is configured to detect absence of measurements based on sensors such as pitot tubes that measure total pressure or static pressure based on pressure lines that may be blocked by unintended objects, and to use the sensed parameters to update an air speed data dependent value captured before the detected absence so that when there is a failure of a sensor such as a pitot tube that measures total pressure or static pressure based on a pressure line that may be blocked by unintended objects, then air speed data estimated based on sensors other than the failed sensor is used to operate the aircraft.

10. The system of claim 9 wherein the processor is configured to perform Low Pass, Kalman or Complementary filtering on the estimated air speed data before providing it to a flight computer and/or a display.

11. The system of claim 10 wherein the estimated air speed data comprises angle of attack.

12. The system of claim 9 wherein the estimated air speed data comprises airspeed.

13. The system of claim 9 wherein the estimated air speed data comprises Mach number.

14. The system of claim 9 wherein the estimated air speed data comprises angle of sideslip.

15. A method of training a neural network for use on board an aircraft, comprising:

inputting to a neural network training data comprising model data and/or flight test data, the training data comprising sensed parameters that do not depend on measurements of total pressure or static pressure based on a pressure line that may be blocked by unintended objects, the parameters comprising (a) Ground Speed (GS), (b) Angle of Trajectory (Gamma), (c) Angle of Attitude (Theta), (d) Longitudinal Acceleration Load Factor (Nx), (e) Lateral Acceleration Load Factor (Ny), (f) Vertical Acceleration Load Factor (Nz), and (g) Delta Temperature from Standard Atmosphere or Total Air Temperature (TAT); and training the neural network to estimate air speed data and/or dynamic pressure comprising kinetic energy per unit volume of fluid moving around the aircraft based solely on the parameters that do not depend on measurements of total pressure or static pressure based on a pressure line that may be blocked by unintended objects, upon the event of failure of a sensor that measures total pressure and or static pressure based on a pressure line that may be blocked by unintended objects, wherein the neural network is trained to estimate aircraft air data independent of any signals from air data sensors whose values are based on airflow pressure measurements.

* * * * *